US007469722B2

(12) United States Patent
Berland

(10) Patent No.: US 7,469,722 B2
(45) Date of Patent: Dec. 30, 2008

(54) SEGMENTED BEND STIFFENER

(76) Inventor: Norvald Berland, Sælenveien 57A, Fyllingsdalen (NO) N-5143

( * ) Notice: Subject to any disclaimer, the term of this patent is extended or adjusted under 35 U.S.C. 154(b) by 114 days.

(21) Appl. No.: 11/612,497

(22) Filed: Dec. 19, 2006

(65) Prior Publication Data

US 2008/0142106 A1 Jun. 19, 2008

(51) Int. Cl.
*F16L 11/00* (2006.01)

(52) U.S. Cl. ....................... 138/155; 138/110; 138/120; 174/68.3

(58) Field of Classification Search ................. 138/120, 138/110, 155; 174/68.3; 285/154.3
See application file for complete search history.

(56) References Cited

U.S. PATENT DOCUMENTS

| | | | | |
|---|---|---|---|---|
| 3,162,214 | A * | 12/1964 | Bazinet, Jr. | 138/120 |
| 4,396,797 | A * | 8/1983 | Sakuragi et al. | 174/68.3 |
| 4,703,135 | A * | 10/1987 | Magnani et al. | 174/135 |
| 4,790,294 | A * | 12/1988 | Allred et al. | 600/141 |
| 4,796,607 | A * | 1/1989 | Allred et al. | 600/141 |
| 4,972,048 | A * | 11/1990 | Martin | 174/136 |
| 5,526,846 | A | 6/1996 | Maloberti | |
| 5,909,007 | A * | 6/1999 | N.o slashed.rholmen | 174/135 |
| 5,996,640 | A * | 12/1999 | Tseng | 138/119 |
| 6,012,494 | A * | 1/2000 | Balazs | 138/119 |
| 6,941,974 | B2 * | 9/2005 | Utaki | 138/120 |
| 2005/0056333 | A1 * | 3/2005 | Utaki | 138/120 |

FOREIGN PATENT DOCUMENTS

| | | |
|---|---|---|
| EP | 1014134 | 6/2000 |
| GB | 2040014 | 8/1980 |
| GB | 2316461 | 2/1998 |
| WO | 94/09245 | 4/1994 |
| WO | 2006/0033579 | 3/2006 |

* cited by examiner

*Primary Examiner*—Patrick F Brinson
(74) *Attorney, Agent, or Firm*—Christian Abel

(57) ABSTRACT

A bend stiffener comprising a modular arrangement of alternating disks of rigid material and flexible material, each disk having a center hole arranged in axial alignment with the center holes of adjacent disks. The axially-aligned disks are arranged intermediate an end plate and a front plate, and are sandwiched together by one or more tensioned wires or other such elongated elements passing from the end plate to the front plate. Either or both the end plate or the front plate contain termination means for connection to a structure, such as for example bolts, threads latches or other locking mechanism.

4 Claims, 6 Drawing Sheets

SEGMENTED BEND STIFFENER

FIELD OF THE INVENTION

This invention is related to bend stiffeners for limiting the bending radius of an elongated body.

BACKGROUND

There exits many form of elongated flexible bodies used for a variety of purposes, such as electrical cables, flexible tubular conduits for conveying fluids, anchoring cables and the like. In many situations it is desirable to limit the bending radius of such elongated bodies. For example, it is often necessary to limit the bending of such bodies at their connection point with another structure. Over-flexing or repeated flexing at the connection point may damage the elongated body if the radius of curvature of the bend is too small.

One solution for this problem is the use of a bend stiffener on the portion of the elongated body that is subjected to the over-flexing. A first example of a bend stiffener known in the art is a polyurethane cone overmoulded around a portion of the elongated body, for example at the end of the body at the termination point with a structure. The cone is affixed to the elongated body by heat-shrinkage during the polymerization process. The cone has a cross section that is substantially thicker than the elongated body, and the rigidity of the polyurethane mass of the body of the cone imposes a bend limitation on the elongated body where the stiffener is attached. Consequently, bend stiffeners of this type often have an enormous mass. In addition, the process of moulding the bend stiffener directly to the elongated body has obvious logistical disadvantages.

A second type of bend stiffener is a polyurethane cone similar in cross section to the previously described type, but rather than being directly moulded to the elongated body, the stiffener is fabricated with an internal bore of predetermined diameter and is moulded to an interface or flange. A stiffener of this type can be slipped over the elongated body and thereafter the interface or flange bolted to a corresponding termination member or flange on the structure. Stiffeners of this type can be formed with a reinforcing member integrated into the polyurethane material, as shown for example in U.S. Pat. No. 5,526,846.

Stiffeners of the above-described type have several disadvantages. Even when an internal reinforcement is employed, stiffeners of this type have a very large mass that makes them unwieldy and cumbersome to install and use. In addition, the cost of production for such stiffeners is quite high. Polyurethane is an expensive material, and separate molds must be made for stiffeners having different dimensions.

SUMMARY OF THE INVENTION

The present invention overcomes the above-described disadvantages with known bend stiffeners, as well as possessing other advantages that will be apparent to one skilled in the art, by providing a bend stiffener comprising a modular arrangement of alternating disks of rigid material and flexible material, each disk having a center hole arranged in axial alignment with the center holes of adjacent disks. The axially-aligned disks are arranged intermediate an end plate and a front plate, and are sandwiched together by one or more tensioned wires or other such elongated elements passing from the end plate to the front plate. Either or both the end plate or the front plate contain termination means for connection to a structure, such as for example bolts, threads latches or other locking mechanism. The front plate may also be equipped with an end cap having different functions. For example, the end cap may comprise means for engaging a portion of a cable, for example for retaining the reinforced outer insulation layer of a seismic cable. This would permit pulling forces to be taken up by the reinforced outer layer rather than the internal electrical wires of such cables. An example of such means would be a conical end cap that receives a conically-flared end section of the cable's outer reinforced layer.

Because the bend stiffener according to the invention is modular, disks of different dimensions or having holes of different diameter, or being made of materials having differing degrees of flexibility can be prefabricated. Bend stiffeners of varying length, able to accommodate cables or conduits of varying diameter can therefore be easily assembled as needed. The degree of flexibility of the bend stiffener can easily be adjusted by altering such parameters as the thickness of the flexible discs, the tension of the wire or wires holding the disks together, as well as by selecting disks made of differing materials.

BRIEF DESCRIPTION OF THE DRAWINGS

The invention will be described in detail below with reference to the attached figures, wherein.

DETAILED DESCRIPTION OF THE INVENTION

As shown in FIGS. 1, 2, 3 and 4, the bend stiffener according to the invention comprises an alternating series of rigid disk segments 10 and flexible disk segments 12, axially-aligned. Rigid disk segments 10 may preferably be made of a corrosion-resistant, high tensile strength metal. The rigid disks could alternately be made of other material such as a rigid polymer or plastic. The flexible disks 12 can be made of rubber, a flexible polymer or other appropriate material.

Figure 6:
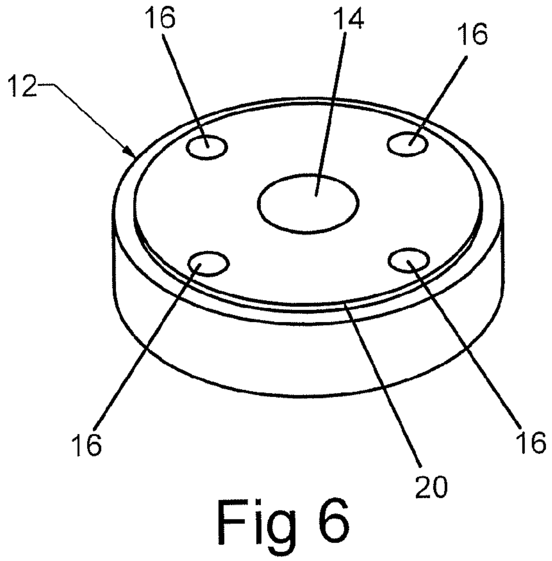
Figure 8:
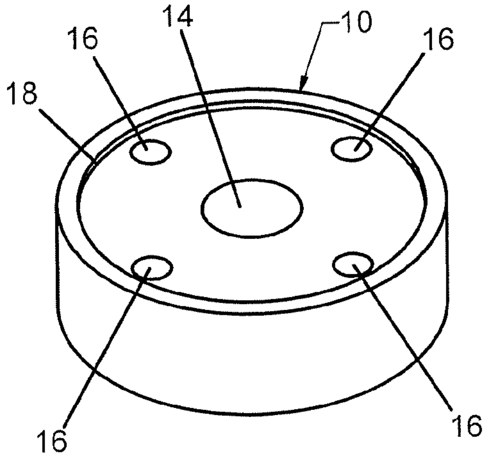
FIG. 8 is a perspective view of a rigid disk segment
Figure 9:
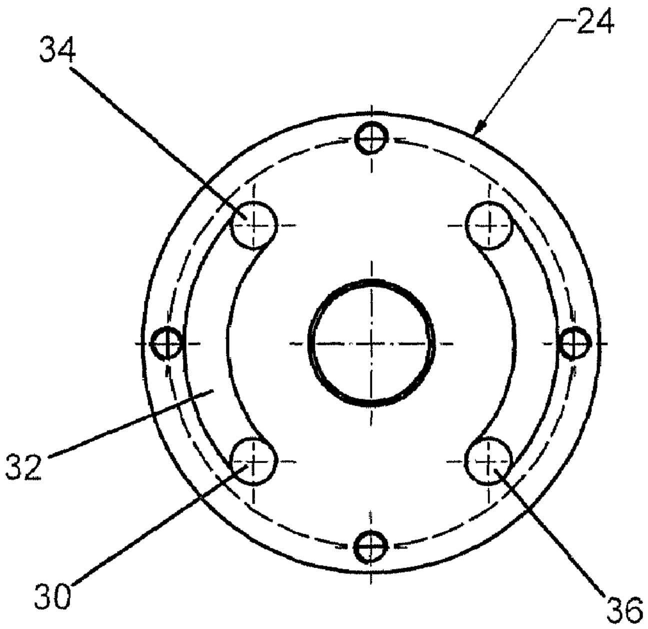
FIGS. 9 and 10 are side and top views of the front plate
Figure 10:
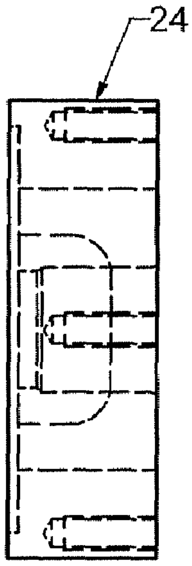

As shown in FIGS. 5-8, the disks have a center hole 14 and a plurality of peripheral holes 16. As shown in FIG. 8, rigid disks 10 preferably have a slight recess 18 that corresponds with a slight protrusion 20 on adjacent flexible disks 12 as seen in FIG. 6.

Figure 1:
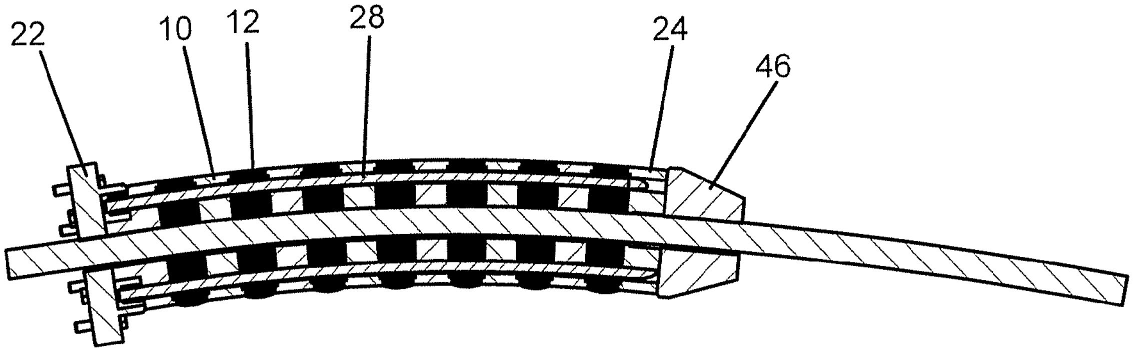
FIG. 1 is a side view, in lengthwise cross section, of a first embodiment of the invention
Figure 2:
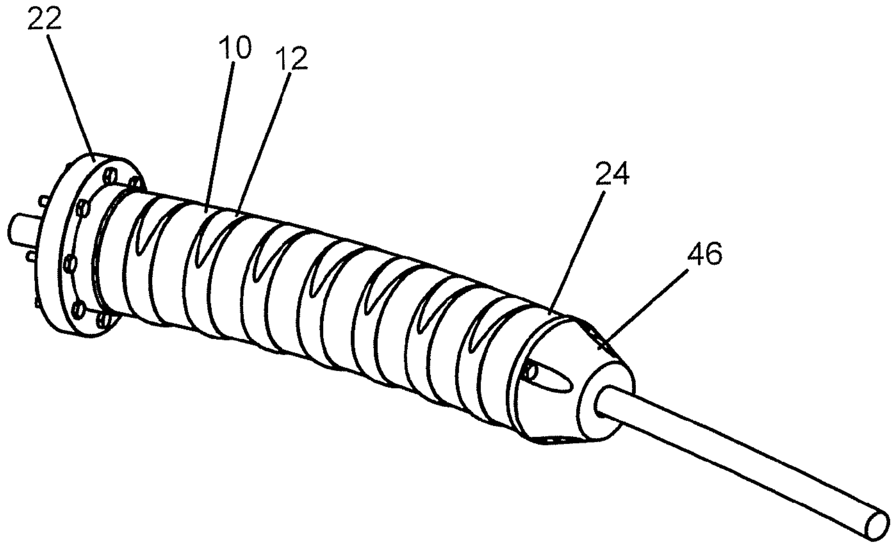
FIG. 2 is a perspective view of a first embodiment of the invention
Figure 3:
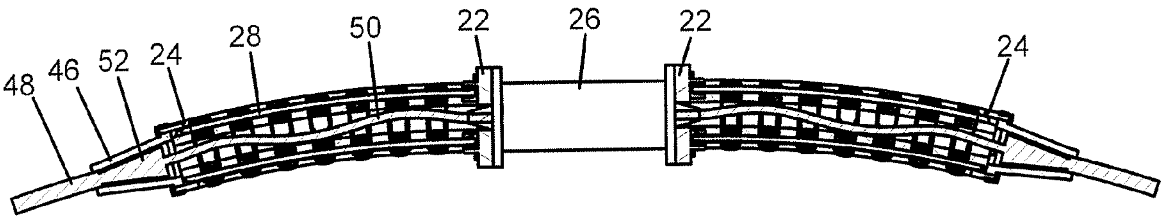
FIG. 3 is a side view, in lengthwise cross section, of a second embodiment of the invention
Figure 4:
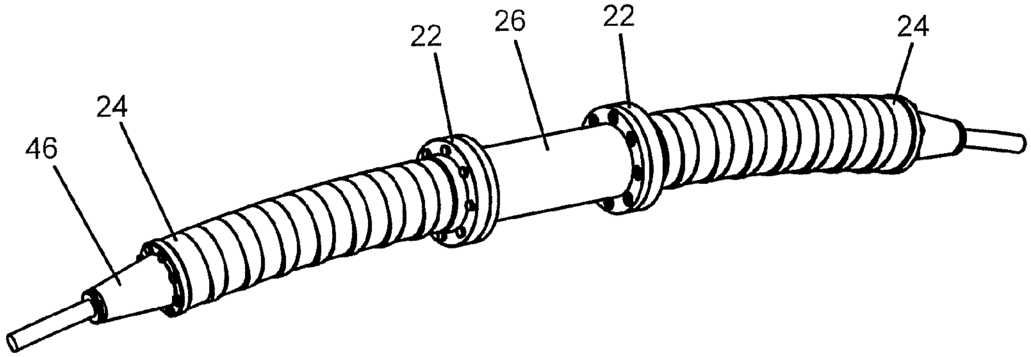
FIG. 4 is a perspective view of a second embodiment of the invention
Figure 5:
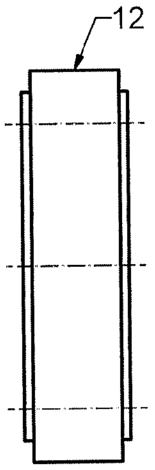
FIGS. 5, 6 and 7 are side, cross sectional and perspective views respectively of a flexible disk segment
Figure 7:
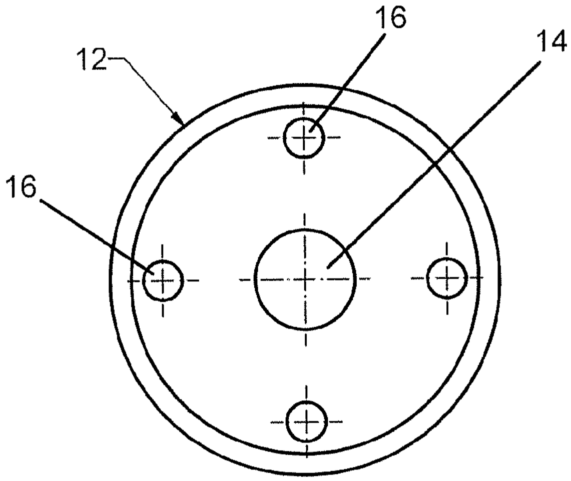

As shown in FIGS. 1 and 3, the disks are arranged with their respective center holes and peripheral holes coaxially aligned. The disks are arranged intermediate an end plate 22 at one end and a front plate 24 at the other end. In a preferred embodiment end plate 22 is in the form of a termination member with bolts, threads or other attachment means for connection to a structure. The front plate could also comprise such a termination member as well. FIGS. 3 and 4 show a housing 26, for example for containing electronics, as the structure, however one skilled in the art can envision a multitude of structures to which the bend stiffener could be terminated.

Figure 11:
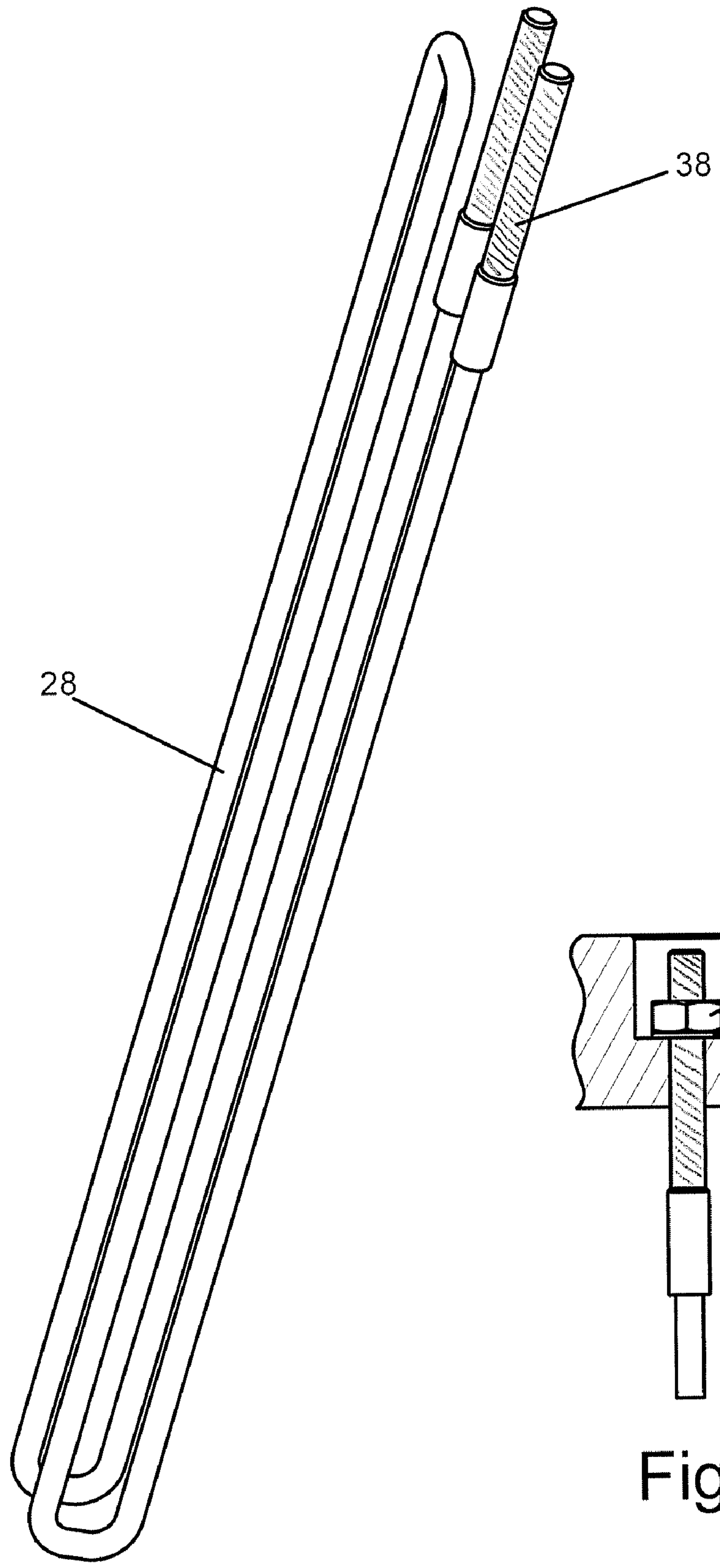
FIG. 11 is a perspective view of a first embodiment of a tensioning wire
Figure 12:
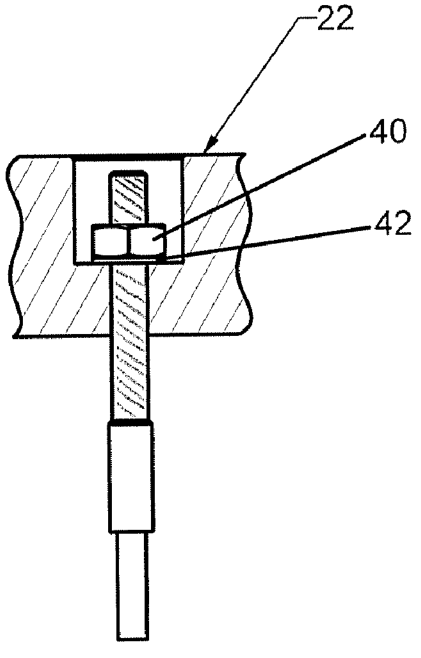
FIG. 12 is a cross sectional view of a first embodiment of a connection means between the wire from FIG. 11 and the front plate

The alternating disks are held together by one or more tensioned wires 28 passing from end plate 22 to front plate 24 through peripheral holes 16. In a preferred embodiment, a single continuous wire 28 is used, as depicted in the alternate examples of this embodiment illustrated in FIGS. 11 and 13. In this embodiment, single wire 28 begins at end plate 22, passes through openings 16 in the intermediate disks, passes through a first opening 30 in front plate 24, rests in a curved groove 32, passes back through a return opening 34, passes back through a different set of aligned openings 16, engages end plate 22, doubles back once more and passes back through yet another set of openings 16, whereupon wire 28 passes through a third opening 36 in front plate, rests in a second curved groove 32, and finally passes back to end plate 22. In the embodiment shown in FIG. 11, a pair of threaded bolts 38 are affixed to the ends of wire 28. This embodiment is attached to end plate 22 with a nut 40 and washer 42. In this embodiment, the tension of wire 28 may be adjusted by tightening or loosening nut 40.

Figure 13:
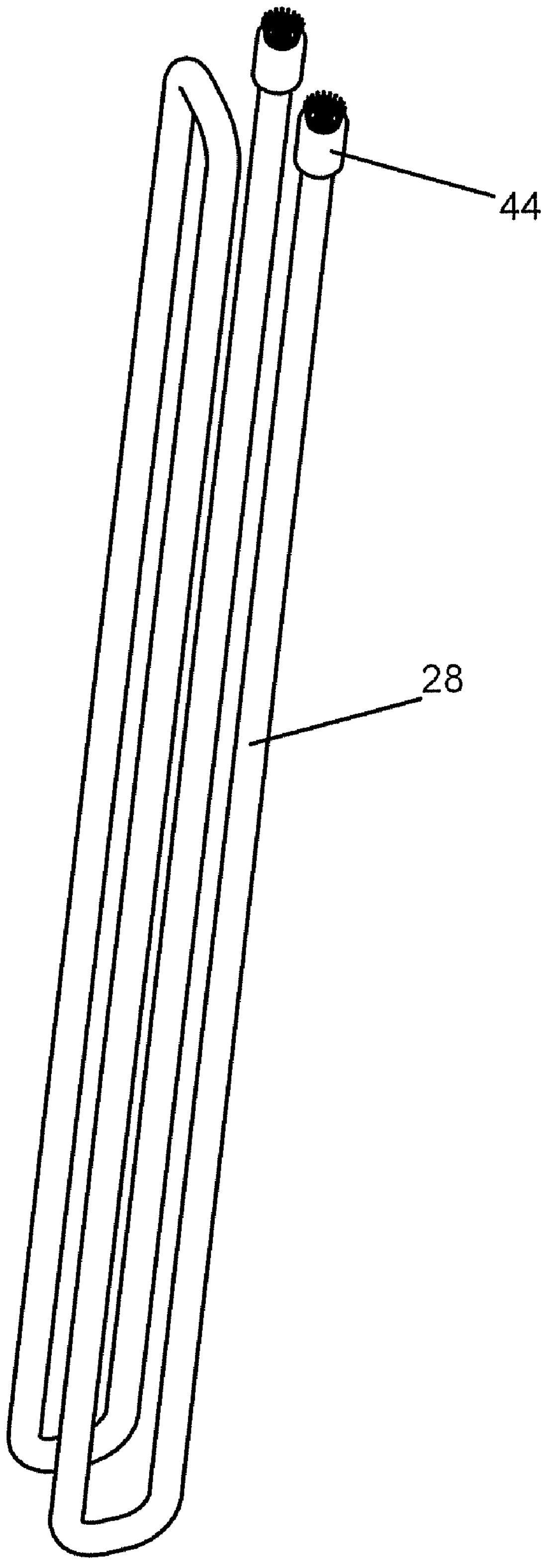
FIG. 13 is a perspective view of a second embodiment of a tensioning wire
Figure 14:
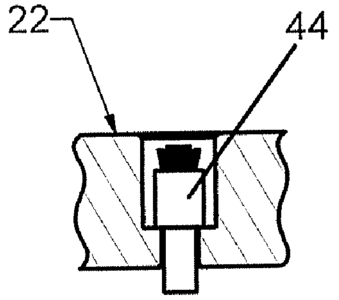
FIG. 14 is a cross sectional view of a second embodiment of a connection means between the wire from FIG. 13 and the front plate

In the embodiment shown in FIG. 13, a pair of collars 44 are clamped onto wire 28 in order to attach the wire to end plate 22. In this embodiment, a press is used to compress the disks together, whereupon collars 44 are clamped on wire 28, and the pressure for the press released.

In both embodiments described above, the use of a single wire resting in grooves 32 permits slight realignments of the wire in response to changing lengths of the sides of the stiffener as the stiffener bends to one side or another. It should be apparent however, that a plurality of wires could be arranged passing from end plate 22 to front plate 24.

After the disks have been assembled and wires 28 tensioned, an end cap 46 may be attached to front plate 24. The bend stiffener may then be slipped over an elongated body 27 and thereafter terminated to the structure.

End cap 46 serves to protect the ends of wire 28, as well as providing a transition from the disks to the elongated body. End cap 46 may also serve an addition function, as for example the embodiment of an end cap shown as 46'.

In some circumstances, the elongated body will not only be subjected to bending forces, but to pulling forces as well. FIGS. 3 and 4 illustrate one such application, namely a plurality of segments of seismic cables connected to one or more housings 26 that hold electronic components. Seismic cables typically comprise an outer reinforced insulation layer 48 surrounding internal electrical cables 50. Several segments as depicted in FIG. 3 can be arranged in series and towed by ships during petroleum exploration, resulting in the cables being exposed to significant pulling forces. It is important that those pulling forces be taken up by the reinforced outer layer rather than the internal electrical cables, otherwise the electrical connection with the housing could be compromised. Therefore, in one embodiment end cap 46' may be formed with a conical bore as depicted in FIG. 3. This conical bore receives a conically flared end 52 of the reinforced out layer of the seismic cable.

The invention claimed is:

1. A bend stiffener for limiting the bending radius of an elongated body, comprising a plurality of alternating disks of rigid material and flexible material, each disk having a center hole of sufficient diameter to accommodate the elongated body, the center hole of each disk being arranged in axial alignment with the center holes of adjacent disks, wherein the axially-aligned disks are arranged intermediate an end plate and a front plate, one or both of which having a termination member, the disks further comprising a plurality of peripheral holes arranged around the disks' center holes, the peripheral holes of adjacent disks being in axial alignment with each other, said disks being sandwiched together by a single wire that has a first end connected to the end plate, passes through one set of axially-aligned peripheral holes to the front plate, rests in a groove in the front plate, passes back to the end plate through a second set of axially-aligned peripheral holes, engages the end plate, returns to the front plate through a third set of axially-aligned peripheral holes and rests in a second groove in the front plate, and passes yet again back to the end plate through a fourth set of axially-aligned peripheral holes, and has its second end connected to the end plate.

2. A bend stiffener according to claim 1, wherein the ends of the wire have threads, and the wire is connected to the end plate by bolts that may be tightened or loosened in order to adjust the clamping force sandwiching the disks together.

3. A bend stiffener according to claim 1, wherein the disks are pressed together by a press and the wire connected thereafter to the end plate.

4. A bend stiffener according to either of claims 2 or 3, wherein an end cap having a conical bore is attached to the front plate.

* * * * *